United States Patent [19]
Chethik et al.

[11] Patent Number: 5,917,384
[45] Date of Patent: Jun. 29, 1999

[54] MODULATING ARRAY TRANSMITTER AND METHOD HAVING IMPROVED ON-OFF KEYING

[75] Inventors: Frank Chethik, Palo Alto, Calif.; Paul Schwartz, Richardson, Tex.

[73] Assignee: Lockheed Martin Corporation, Bethesda, Md.

[21] Appl. No.: 08/942,510

[22] Filed: Oct. 2, 1997

[51] Int. Cl.[6] .................................................. H04L 27/36
[52] U.S. Cl. ........................ 332/103; 375/298; 375/308; 375/261
[58] Field of Search ........................... 332/103; 375/298, 375/312, 308, 261

[56] References Cited

U.S. PATENT DOCUMENTS 5,612,651  3/1997  Chethik ................................... 332/103

Primary Examiner—Arnold Kinkead
Attorney, Agent, or Firm—Kenneth W. Float

[57] ABSTRACT

A modulating array transmitter employing a method that provides for improved power efficiency. The present inventors have observed that for symbols where pairs of power amplifiers of the modulating array transmitter are driven with opposing phases, the pairs of power amplifiers may both be keyed off to conserve prime power. The transmitter has a lookup table for providing a plurality of digital input signals and an on/off keying bit input signal, a plurality of quadraphase power elements that each comprise a modulator coupled to the lookup table and to a reference signal source, and a high efficiency amplifier coupled to a power source. A power combiner combines outputs of the plurality of power elements to produce a quadrature amplitude modulated (QAM) output constellation containing a plurality of symbols. The on/off keying bit input signal is used to key off selected pairs of power amplifiers that are driven with opposing phases and produce certain of the symbols of the constellation. When the selected pairs of power amplifiers are keyed off, prime power provided to the amplifiers of the transmitter is conserved.

7 Claims, 1 Drawing Sheet

4 STATE QPSK CONSTELLATION

16 STATE QAM CONSTELLATION

MODULATING ARRAY TRANSMITTER AND METHOD HAVING IMPROVED ON-OFF KEYING

GOVERNMENT RIGHTS

The present invention was developed under a contract with the United States Government. The U.S. Government has certain rights in this invention.

BACKGROUND

The present invention relates generally to modulating array transmitters, and more particularly, to a modulating array transmitter having an on-off keying method that provides for improved power efficiency.

It is known in the art to produce multiple amplitude and phase modulated signals that can assume discrete states of a multi-state signal constellation. Quadrature amplitude modulation (QAM) is one such known technique. Prior devices that produce such signals have typically used traveling wave tube amplifiers, for example.

However, a problem may occur when traveling wave tube amplifiers are used. In order to reduce constellation distortion in applications where constellations are complex and have many possible states (e.g., 64 QAM), traveling wave tube amplifiers must be operated in a high back-off, linear operating mode. However, when operated in this mode, traveling wave tube amplifiers do not perform efficiently. Thus, the use of traveling wave tube amplifiers is not optimum for applications wherein high operating power efficiency is required when generating complex QAM waveforms.

One such application is one involving a satellite-based QAM signal transmitter. In high rate data signal transmission applications, such as satellite applications, wherein it is necessary to transmit microwave signals through severely bandwidth-limited frequency channels, it is a desirable goal to efficiently transmit many data bits per state of a QAM signal constellation.

To solve this problem, the assignee of the present invention has heretofore developed a modulating array transmitter that is disclosed in U.S. Pat. No. 5,612,651, entitled "Modulating Array QAM Transmitter". This modulating array transmitter disclosed has a plurality of saturated phase shift key modulated power stages (comprising a phase shift keyer driving a power amplifier) that produce various amplitude-phase keyed digital signal constellations. For many of the less than full amplitude output power states, the outputs from pairs of power stages are combined so that their output signals cancel. These states require full prime power to drive the power amplifiers and since their outputs do not contribute to useful output power. These symbol states may be achieved by turning off these power amplifier pairs during their symbols, and conserving their prime power.

As for other known prior art, U.S. Pat. No. 5,381,449 issued to Jasper et al. entitled "Peak to Average Power Ratio Reduction Methodology for QAM Communications Systems" discloses a method for improving the ratio of peak power level to average power level in a power amplifier used in a multi-channel, N-level QAM transmitter. U.S. Pat. No. 5,381,449 discloses that the ratio of peak power level to average power level can be reduced by preselecting magnitudes and phase angles of complex-valued pilot symbols used in the transmitter of the QAM communication system. Pilot symbols are preselected that are not part of the well-known constellation of values normally used in the communications system. The pilot values change over time and over channels to reduce the peak to average power ratio in the composite signal produced by the transmitter.

Therefore, it would be advantageous to have a means and methods for improving the efficiency of a modulating array transmitter. Accordingly, it is an objective of the present invention to provide for a modulating array transmitter and method employing on-off keying of amplifiers that improves the power efficiency of the transmitter.

SUMMARY OF THE INVENTION

To meet the above and other objectives, the present invention provides for a modulating array transmitter and method that provides for improved power efficiency of the transmitter. The present invention provides for an improvement to the modulating array transmitter disclosed in U.S. Pat. No. 05,612,651. The present inventors have observed that for symbols where pairs of power amplifiers of the modulating array transmitter are driven with opposing phases, the pairs of power amplifiers may both be keyed off to conserve prime power.

More particularly, the present modulated array transmitter comprises a prime power source, a plurality of quadraphase power elements, and a power combiner coupled to the plurality of quadraphase power elements. The plurality of quadraphase power elements each comprise a quadrature phase shift keyed (QPSK) modulator that receive digital input signals, an on/off keying bit input signal that selectively keys the modulator on and off, and a local oscillator reference input signal. Each quadraphase power element modulates and amplifies the reference input signal in accordance with the digital input signals to output a modulated RF excitation signal.

Each of the plurality of quadraphase power elements also comprise a high efficiency power amplifier for receiving the modulated RF excitation signal and for receiving power from the prime power source. Each high efficiency power amplifier outputs an amplified quadrature phase shift keyed (QPSK) modulated output signal. The power combiner combines the amplified QPSK modulated output signals derived from the plurality of QPSK modulators to produce a quadrature amplitude modulated (QAM) output constellation containing a plurality of symbols.

In accordance with the present invention, selected pairs of power amplifiers that are driven by their respective QPSK modulators in opposing phases to form certain symbols are each keyed off using the respective on/off keying bit input signal coupled to the corresponding QPSK/on-off keyer modulator. When the selected pairs of power amplifiers are keyed off, prime power provided to the amplifiers of the transmitter is conserved.

In particular, the present invention uses high efficiency power amplifiers that are biased into cut-off mode until they are driven into conduction by the RF excitation signal and/or control signals. In cut-off mode they do not consume significant power from the prime power source. This has the effect of improving the overall operating prime power efficiency of the modulating array transmitter by as much as fifteen percent.

This improvement in prime power efficiency results in an overall prime power efficiency (for some configurations of the modulating array transmitter) that is competitive with the efficiency of a traveling wave tube amplifier-based transmitter operating in its most efficient mode, wherein it transmits a constant amplitude carrier at saturation. The improvement provided by the present invention makes the modulating array transmitter a stronger candidate for implementation in a digital satellite transmitter system than without the improvement.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
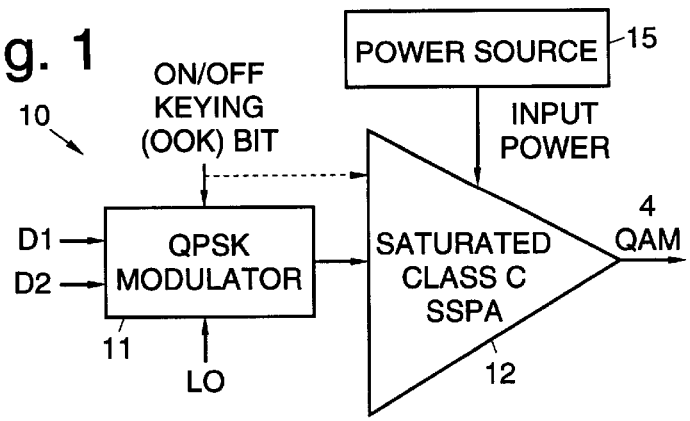
FIG. 1 illustrates a single quadraphase power element that may be used in a modulating array transmitter in accordance with the principles of the present invention.
Figure 2:
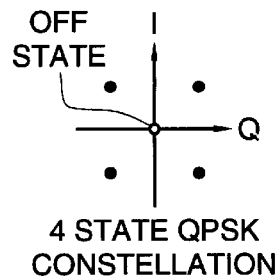
FIG. 2 illustrates a four point QPSK constellation produced by the quadraphase power element of FIG. 1.

Referring to the drawing figures, FIG. 1 illustrates a quadraphase power element (QPE) 10 that may be used in a modulating array transmitter 20 in accordance with the principles of the present invention. The quadraphase power element 10 is comprised of a QPSK modulator 11 having first and second data inputs for receiving digital input signals D1, D2, a local oscillator (LO) input for receiving a local oscillator reference input signal, and an on/off keying input for receiving an on/off keying bit input signal. The QPSK modulator 11 operates to phase key the local oscillator (LO) reference input signal in accordance with the values of the two digital input signals D1, D2. The QPSK modulator 11 is coupled to a saturated high efficiency solid state power amplifier (SSPA) 12. The saturated high efficiency solid state power amplifier 12 is coupled to a power source 15 that provides input power thereto. The output of the high efficiency saturated solid state power amplifier 12 is a four state quadrature phase shift keyed constellation (QPSK) comprising an I, Q signal constellation shown in FIG. 2.

The on/off keying bit input signal is used in accordance with the principles of the present invention to enable and disable the output of the QPSK modulator 11, which correspondingly turns on and off the RF drive signal supplied to the high efficiency power amplifier 12. When the on/off keying bit input signal disables the output of the QPSK modulator 11, this shuts off the conductivity of the power amplifier 12 when it operates in Class C and higher efficiency modes. For amplifiers operating in class B and lower efficiency modes, the on/off keying bit signal may be used to reduce the conductivity of the power amplifier to provide a higher efficiency boost than would otherwise be obtained in these conditions. The resultant reduction in current drawn from the power source 15 during the off state increases the overall efficiency of the transmitter 20 when multiple quadraphase power elements 10 are employed to generate a multi-symbol QAM constellation. This will be discussed in more detail with regard to FIGS. 3 and 4.

Figure 3:
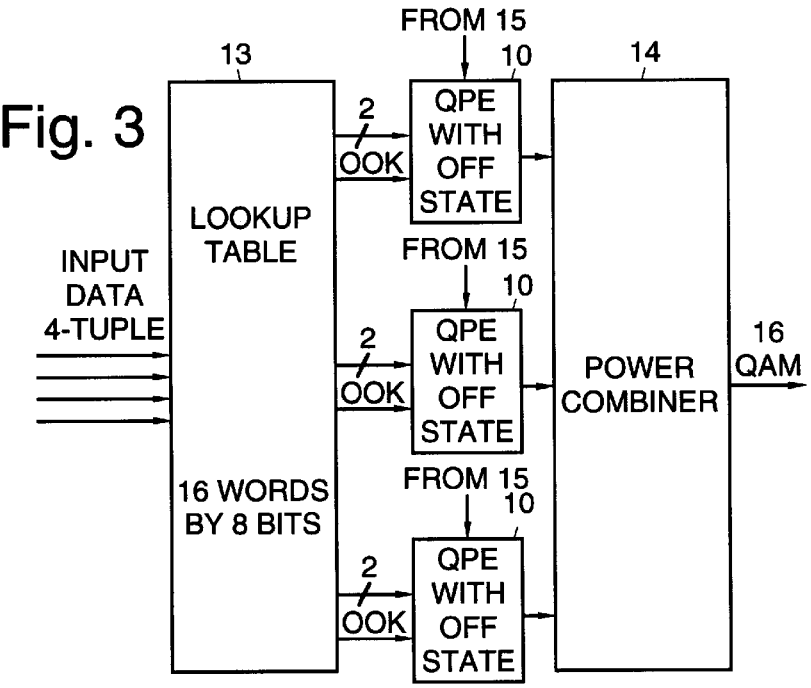
FIG. 3 illustrates a modulating array transmitter using three quadraphase power elements to generate a 16 point QAM constellation.
Figure 4:
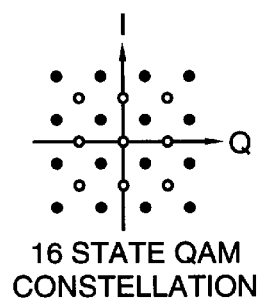
FIG. 4 illustrates a 16 point QAM constellation produced by the modulating array transmitter of FIG. 3.

FIG. 3 illustrates a modulating array transmitter 20 using three quadraphase power elements 10 shown in FIG. 1 to generate a 16 point QAM constellation. The embodiment of FIG. 3 is illustrative of but one embodiment of a transmitter 20 in accordance with the principles of the present invention. FIG. 4 illustrates a 16 point QAM constellation produced by the modulating array transmitter shown in FIG. 3.

In general, the modulating array transmitter 20 comprises an array of nearly identical solid state power amplifiers 12 coupled to an efficient means 14, such as a power combiner 14, for coherently combining the output signals from the solid state power amplifiers 12. Each solid state power amplifier 12 is driven by one QPSK modulator 11, in the manner shown in FIG. 1, and each of the plurality of QPSK modulators 11 is driven by a digital mapping lookup table 13, as is shown in FIG. 3. The digital mapping lookup table 13 outputs the two digital input signals D1, D2 and the on/off keying bit input signal to each respective QPSK modulator 11.

The power amplifiers 12 are driven by the RF excitation signal output from the QPSK modulator 11. The improvement provided by the present invention is to control the on/off states of selected high efficiency power amplifiers 12 in a modulating array transmitter 20 having a large number of quadraphase power elements 10. The present invention keys off pairs of power amplifiers 12 that are driven in opposing phases to generate certain symbols, which in turn conserves prime power derived from the power source 15. The on/off keying bit input signal is supplied to relevant pairs of power amplifiers 12 that are driven in opposing phases, which keys them off to conserve power supplied by the power source 15.

For optimal efficiency, the high efficiency amplifiers 12 are biased into cut-off mode until they are driven into conduction by the RF excitation signal and/or the on/off keying bit control signal from the respective QPSK modulators 11 coupled thereto. In cut-off mode the high efficiency amplifiers 12 do not consume significant power from the prime power source 15. This has the effect of improving the overall operating efficiency of the modulating array transmitter 20 by as much as 15 percent. In cases where the high efficiency amplifiers 12 are operating in less than Class C efficiency the on/off keying bit may be used to obtain the same level of improvement for the modulating array transmitter 20. Without the use of the on/off keying bit to reduce the static power consumption in the high efficiency amplifiers 12, a lesser efficiency improvement will be obtained.

Table 1 illustrates examples of QAM constellations, the number of bits represented by a respective QAM constellation, and bandwidth efficiencies (BWE) (bits/second/Hz) associated with modulating array transmitters 20 having respective numbers of quadraphase power elements 10 as shown in the table. Table 1 assumes a bandwidth occupancy of 1.2 Hz/symbol/second and a forward error correction rate of 0.9. For each of the modulating array transmitters 20 listed in Table 1, the number of bits per symbol is equivalent to the number of data bits addressing the lookup table 13.

TABLE 1

| Number of QPEs | Constellation | Bits per symbol | BWE |
| --- | --- | --- | --- |
| 3 | 16 QAM | 4 | 3.0 |
| 7 | 64 QAM | 6 | 4.5 |
| 15 | 256 QAM | 7 | 6.0 |
| 31 | 1024 QAM | 10 | 7.5 |
| 63 | 4096 QAM | 12 | 9.0 |
| 127 | 8192 QAM | 14 | 10.5 |

The bandwidth efficiencies (BWE) shown in Table 1 are measured in terms of bits per second per Hertz of signal bandwidth. Typical QAM transmission requires a bandwidth of 1.25–2.0 Hertz per symbol per second. Additional "overhead" may be required for error correction coding if it is used. The cited BWE figures include coding overhead as well as excess bandwidth to suppress intersymbol interference.

For certain configurations of the modulating array transmitter 20, the improvement provided by the present invention results in an overall prime power efficiency that is competitive with the efficiency of a traveling wave tube amplifier-based transmitter operating in its most efficient mode, wherein a constant amplitude carrier is transmitted at saturation. The improvement provided by the present invention advantageously permits the present modulating array transmitter 20 to be used in a digital satellite transmitter system, for example, where power conservation is highly desirable.

Figure 5:
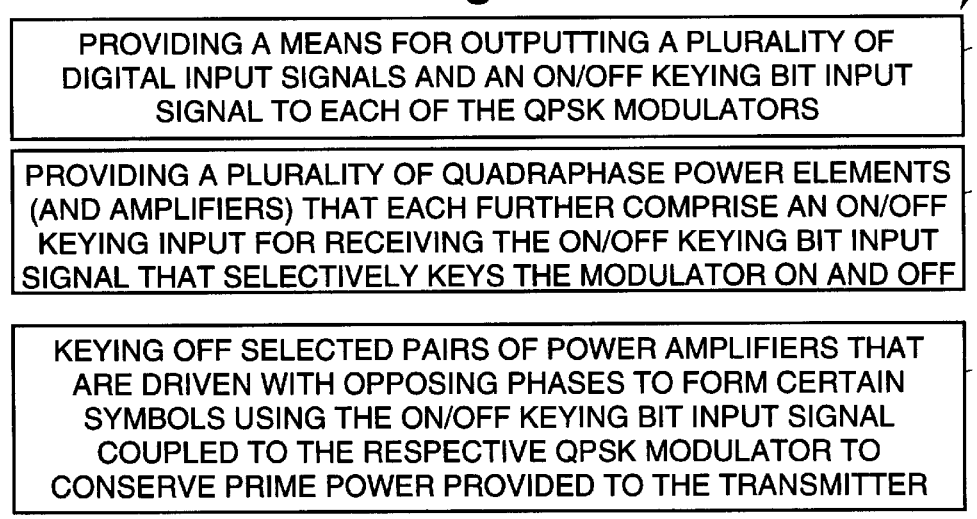
FIG. 5 illustrates one method in accordance with the principles of the present invention.

The present invention also provides for a method 30 of improving the efficiency of a modulated array transmitter described with reference to FIG. 3, for example. A exemplary embodiment of the present method 30 is shown in FIG. 5. The method 30 comprises the following steps. A means 13, such as 31 a digital mapping lookup table 13, is provided 31 for outputting a plurality of digital input signals and an on/off keying bit input signal to each of the QPSK modulators 11. A plurality of quadraphase power elements 10 are provided 32 that each comprise an on/off keying input for receiving the on/off keying bit input signal that selectively keys the modulator 11 on and off. In accordance with the present method, selected pairs of power amplifiers 12 that are driven with opposing phases to form certain symbols are keyed off 33 using the on/off keying bit input signal to conserve prime power provided to the transmitter.

Thus, a modulating array transmitter having on-off keying and improved power efficiency has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A modulated array transmitter having improved power efficiency comprising:

means for providing a plurality of digital input signals and an on/off keying bit input signal;

a prime power source;

a plurality of quadraphase power elements that each comprise:

a QPSK modulator having first and second data inputs for receiving digital input signals, an on/off keying input for receiving an on/off keying bit input signal that selectively keys the modulator on and off, and a local oscillator input for receiving a reference input signal, for modulating the reference input signal in accordance with the digital input signals to output a modulated RF excitation signal; and a high efficiency power amplifier coupled to the QPSK modulator for receiving the modulated RF excitation signal and on/off keying bit input signal therefrom and coupled to the prime power source for receiving power therefrom, and for outputting an amplified quadrature amplitude modulated output signal; and a power combiner coupled to the plurality of quadraphase power elements for combining the amplified quadrature amplitude modulated output signals derived from the plurality of quadraphase power elements to output a quadrature amplitude modulated output constellation containing a plurality of symbols;

and wherein selected power amplifiers are turned off by means of the respective on/off keying bit input signal coupled to the respective QPSK modulator so as to conserve prime power provided to the transmitter.

2. The transmitter of claim 1 wherein the high efficiency power amplifier comprises a saturated high efficiency power amplifier.

3. The transmitter of claim 1 wherein the means for providing the plurality of digital input signals and the on/off keying bit input signal comprises a digital mapping lookup table.

4. In a modulated array transmitter comprising a prime power source, a plurality of quadraphase power elements that each comprise a QPSK modulator for modulating a reference input signal in accordance with a plurality of the digital input signals to produce a modulated RF excitation signal, and a high efficiency power amplifier for receiving the modulated RF excitation signal and for receiving power from the prime power source, for outputting an amplified quadrature amplitude modulated output signal, means for outputting a plurality of digital input signals to each QPSK modulator, and a power combiner coupled to the plurality of quadraphase power elements for combining the amplified QPSK output signals derived from the plurality of quadraphase power elements to produce a quadrature amplitude modulated (QAM) output constellation containing a plurality of symbols, a method of improving the efficiency of the modulated array transmitter that comprises the steps of:

providing a means for outputting a plurality of digital input signals and an on/off keying bit input signal to each of the QPSK modulators;

providing a plurality of quadraphase power elements that each further comprise an on/off keying input for receiving the on/off keying bit input signal that selectively keys the modulator on and off; and turning off selected power amplifiers using the on/off keying bit input signal coupled to the respective QPSK modulator to conserve prime power provided to the transmitter.

5. The method of claim 4 wherein the step of providing the means for outputting the plurality of digital input signals and the on/off keying bit input signal to each of the QPSK modulators comprises the step of providing a digital mapping lookup table for outputting the respective signals.

6. In a modulated array transmitter comprising a prime power source, a plurality of quadraphase power elements that each comprise a QPSK modulator for modulating a reference input signal in accordance with a plurality of the digital input signals to produce a modulated RF excitation signal, and a high efficiency power amplifier for receiving the modulated RF excitation signal and for receiving power from the prime power source, for outputting an amplified quadrature amplitude modulated output signal, means for outputting a plurality of digital input signals to each QPSK modulator, and a power combiner coupled to the plurality of quadraphase power elements for combining the amplified QPSK output signals derived from the plurality of quadraphase power elements to produce a quadrature amplitude modulated (QAM) output constellation containing a plurality of symbols, a method of improving the efficiency of the modulated array transmitter that comprises the steps of:

provmding a means for outputting a plurality of digital input signals and an on/off keying bit input signal to each of the QPSK modulators;

providing a plurality of quadraphase power elements and high efficiency power amplifiers that each further comprise on/off keying inputs for receiving the on/off keying bit input signal that selectively key the modulator and amplifiers on and off; and turning off selected power amplifiers using the on/off keying bit input signal coupled to the respective QPSK modulator to conserve prime power provided to the transmitter.

7. The method of claim 6 wherein the step of providing the means for outputting the plurality of digital input signals and the on/off keying bit input signal to each of the QPSK modulators comprises the step of providing a digital mapping lookup table for outputting the respective signals.

* * * * *